Oct. 14, 1941.   C. HECKER   2,258,760

THREAD GAUGE

Filed June 16, 1939   2 Sheets-Sheet 1

Inventor
Carl Hecker
By Blakemore, Spencer & Flint
Attorneys

Oct. 14, 1941.   C. HECKER   2,258,760
THREAD GAUGE
Filed June 16, 1939   2 Sheets-Sheet 2
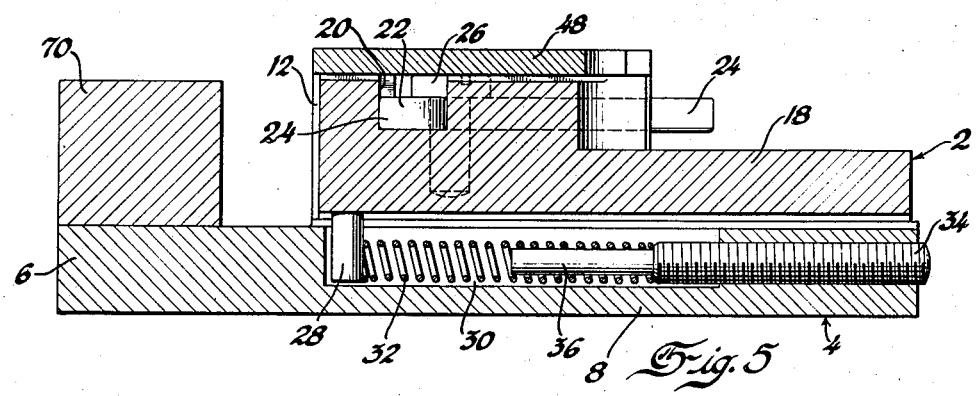
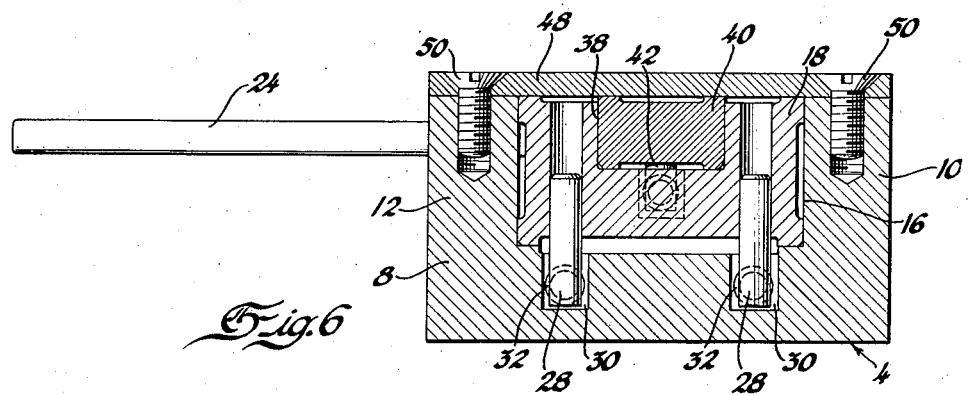
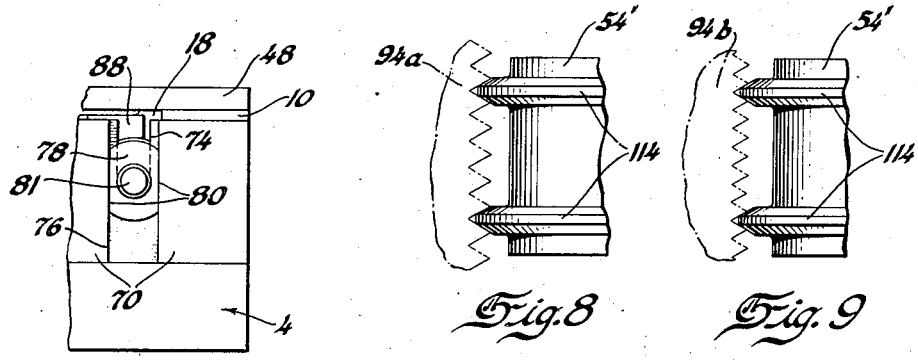
Inventor
Carl Hecker
By
Attorneys Patented Oct. 14, 1941

2,258,760

UNITED STATES PATENT OFFICE 2,258,760

THREAD GAUGE

Carl Hecker, Flint, Mich., assignor to General Motors Corporation, Detroit, Mich., a corporation of Delaware Application June 16, 1939, Serial No. 279,429

11 Claims. (Cl. 33—199)

This invention relates to improvements in gauges for determining the pitch and the pitch diameter of threaded elements such as screws.

The ring gauges of the prior art have been known and used to considerable extent, but it has been found that they are very tiresome on the hands of the operator after a short period of use, and this tiring of the operator's hands has resulted in some unsatisfactory work in the use of the gauges. The gauge of the invention may be used for the entire day and not be tiresome on the operator; it also enables the operator to check the taper or pitch angle of the threads, nicks in the threads, as well as the pitch diameter and pitch of the screw; and it enables the threaded elements to be checked at least twice as fast and with greater accuracy.

The gauge is adaptable to many different pitches and to screws having different pitch diameters. It is also possible to check, with one setting of the rolls, screws having the same pitch diameter but a different pitch or number of threads.

The essential mechanical feature of the gauge is the mounting on a base of three cooperating spaced ribbed gauging rolls. Two of these three rolls are mounted in a stationary position, but the rolls are turnable on their axes. A manually operable slide is mounted on the base and in turn has a second slide mounted therein and on this second slide the third ribbed gauging roll is mounted in stationary position. Springs constantly urge both slides toward the stationary rolls and a limit stop is positioned on the base, between the slides and the stationary rolls, to limit the movement of the slides toward the stationary rolls. An adjustable indicating gauge is mounted in the base and has its operating part in contact with the smaller slide and is operated thereby. A handle pivoted to the base is used for the manual operation of the slides.

On the drawings:

Figure 1 is a plan view of the thread gauge with a part broken away better to show details of construction.

Figures 2, 3, 4, 5, and 6 are sectional views on the corresponding lines of Figure 1, Figure 3 being drawn on a larger scale.

Figure 7 is an end elevation of a part of Figure 1 looking in the direction of the arrows 7—7.

Figures 8 and 9 are details showing the same ribbed gauging rolls used to determine the pitch diameter of two different screws having a different number of threads, but which may or may not have the same outside diameter.

Figure 1:
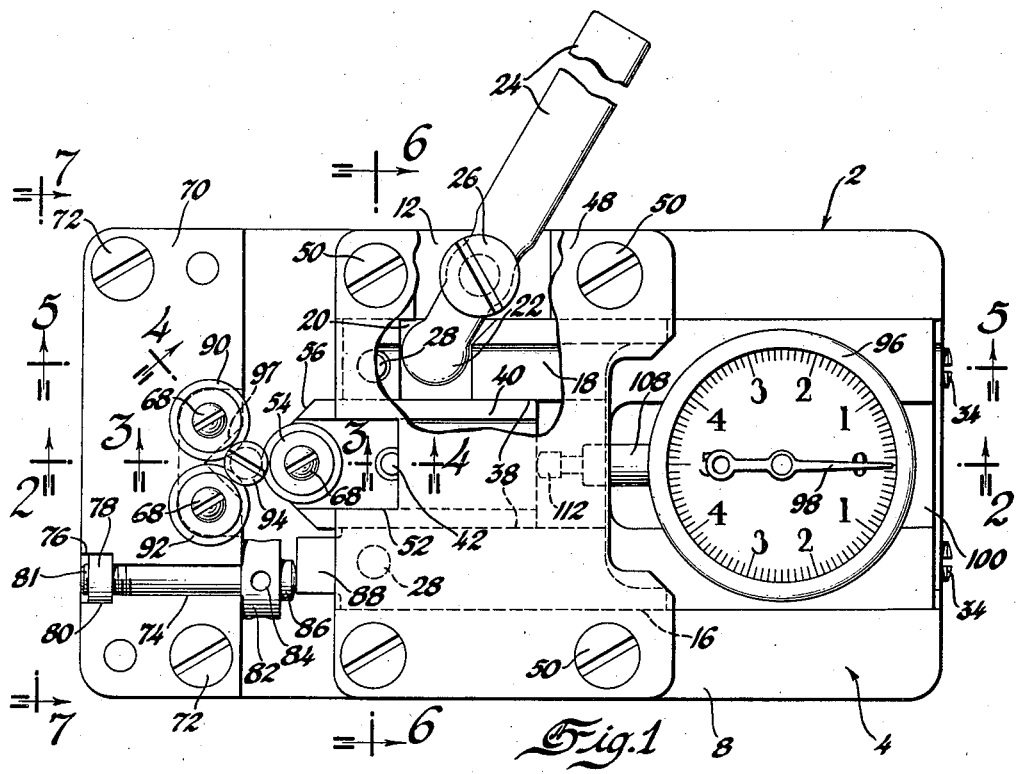

On the drawings, the numeral 2 indicates the thread gauge as a whole. The parts of the thread gauge are mounted on the base 4 which has a short flat end 6 and a longer channel end 8. The channel end has the upstanding sides 10 and 12 (Figure 6) these sides being shorter at the end of the gauge as indicated at 14 in Figure 2. The sides 10 and 12 form a slideway 16 in which there is reciprocably received the slide 18. The slide 18 has a cut-out or notch 20 at one side in which there is received the ball end 22 of a handle 24 pivoted by means of a screw 26 to the side 12 of the base 4. The movement of the handle 24 will shift the slide 18 to the right in Figure 1.

The slide 18 is further provided with the two pins 28 which project downwardly into grooves 30 in the base. One coil spring 32 is positioned in each groove 30 and is adjustable as to tension by means of the threaded element 34 having the reduced end 36 which fits into the center of the coil spring 32. By turning the screw 34 the tension on the spring 32 may be increased or decreased. The springs 32 are under compression and constantly press against the pins 28 to urge the slide 18 to the left in Figures 1, 2, and 5. These springs 32 have no effect on the work or screw to be gauged.

The slide 18 is provided with a slideway 38 in which a slide 40 is reciprocably mounted. This slide 40 has a pin 42 rigidly secured thereto and projects downwardly into a groove or channel 44 formed in the slide 18. A coil spring 46 is received in the groove 44 and is positioned between the pin 42 and the end of the groove and constantly urges the pin 42 and the slide 40 to the left when considering Figures 1, 2, and 5. The spring 46 is considerably weaker than the springs 32. This spring is always compressed the same amount regardless of the diameter of the work being gauged and acts to govern the tension against the work.

The top of the slide 40 is flush with the top of the slide 18 as is best shown in Figure 6, and a cover plate 48 is positioned over both slides and secured to the sides 10 and 12 by means of the machine screws 50.

Figure 2:
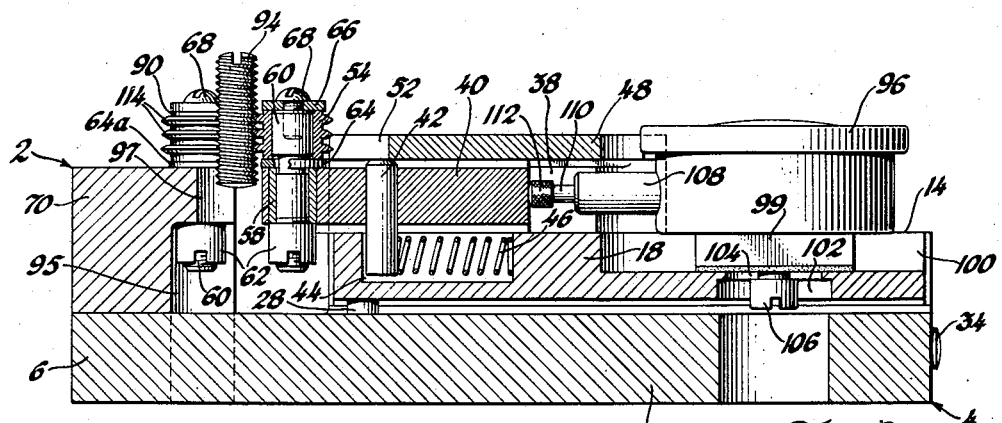

One edge of the cover plate 48 is provided with a recess 52 to receive the ribbed gauging roll 54 when the slides 18 and 40 are moved to the right in Figures 1 and 2. This roll 54 is mounted on the slide 40 in a fixed position and the manner in which it is mounted is shown in Figure 2. The end of the slide 40 is tapered as indicated at 56 and is provided with an opening in which there is fixed the bearing 58. A post 60 is received in the bearing and has a threaded lower end on which there is screwed the nut 62. The post 60 projects above the slide 40 and has the ribbed gauging roll 54 turnably mounted thereon. A spacing washer 64 is positioned between the bottom of the roll 54 and the top of the slide 40 and a retaining washer 66 is positioned at the top of the roll 54 and held in place by means of the machine screws 68 threaded into the end of the post 60.

Equidistant from the center line of the screw gauge, as shown in Figure 1, the end piece 70 has mounted thereon the two ribbed gauging rolls 90 and 92 and these rolls are mounted in the end piece in the identical manner as the roll 54 is mounted in the slide 40. The single difference in the mounting is that the spacing washer 64a for the roll 90 and the corresponding spacing washer for the roll 92 are different in thickness from the spacing washer 64 for the gauging roll 54. Each successive spacer is slightly thicker, and commencing with the spacing washer 64a the corresponding spacing washers for roll 92 will be a little thicker, while the spacing washer 64 will be thicker than the spacing washer for the roll 92. The reason for this difference in thickness is to accommodate the rolls to the spiral angle of the thread of the screw or to the helix angle of the thread. The same effect may be accomplished by providing shoulders on the posts 60, the shoulders being positioned where the washers 64 now are positioned and the one having a thickness different from the others. The roll 54 is positioned on the center line of the gauge as shown in the plan view of Figure 1, while the rolls 90 and 92 are positioned equidistant on opposite sides of the center line so that when the parts are in the position shown in Figures 1 and 2 the rolls 54, 90 and 92 will be at the apices of a triangle and will be in position to gauge the pitch diameter and pitch of a screw 94 shown in its gauging position in the figures. The end piece has an undercut recess 95 to receive the nuts 62, and a V-shaped cutout 97 between the rolls 90 and 92.

The base 4 has an end piece 70 rigidly mounted thereon by means of the machine screws 72. The end piece 70 has a groove 74 which is enlarged at one end as indicated at 76 and in the enlarged part 76 there is received a nut 78 having flattened sides 80 (Figures 7) which fit against the sides of the groove 76 to prevent the nut from turning. In the groove 74 there is positioned the shank of a distance spacer 81, the end of which is threaded into the nut 78. This spacer has the head 82 having openings 84 for the reception of a suitable tool or handle to enable the turning of the distance spacer to enable its removal. On the head 82 there is the extension 86 which is adapted to strike against a block 88 formed as an extension on the slide 18. The distance between the tip of the extension 86 to the adjacent edge of the end piece 70 is definitely predetermined and will determine the extent to which the slide 18 may move toward the end piece; or, in other words, will allow the slide 18 to be moved to a definite stop position, or within a few thousandths of an inch of the pitch diameter of the screw to be measured. The center slide 40 will then move the same distance when gauging the work and the spring 46 will receive the same amount of compression. By removing one distance spacer and replacing it with another, the extent to which the slide 18 may approach the end piece 70 may be changed in order to set the screw gauge, i. e., change the spacing of the rolls, for screws of different diameter. After the distance spacer 81 has been put in place the rolls 54, 90, and 92 are tested for accurate position by means of a standard cylinder (not shown) which is positioned between the rolls in the position of the screw 94 shown in Figures 1 and 2, and with the cylinder in position the indicating gauge 96 at the right hand end of the gauge is adjusted so that its pointer 98 will be at zero as shown in Figure 1.

The casing of this indicating gauge 96 has a rectangular extension 99 which fits into a groove 100 formed in the slide 18. The bottom of the slide beneath the groove 100 is hollowed out as indicated at 102 and a slot 104 is formed in the bottom of the hollowed out part to allow communication with the groove 100. A set screw 106 passes through the groove 104 and is screwed into the extension 99 rigidly to hold the gauge 96 in adjusted position.

The casing of the gauge 96 has an extension arm 108 which acts as a bearing for an operating member 110, having a head 112 which abuts against the end of the slide 40.

In the position of the parts as shown in Figures 1 and 2, if the screw 94 is true in all respects the pointer 98 will register zero on the scale and any deviation in the threads will cause the pointer 98 to swing one way or the other to indicate the degree of inaccuracy of the threads. The indicating gauge 96 may be graduated to read in thousandths or ten thousandths of an inch.

Figures 3, 4:
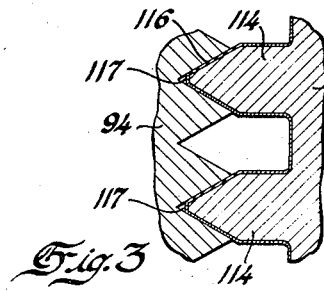

Referring to Figure 3 there is shown an enlarged view of the roll 54 and the position it takes when in contact with the screw 94 to be gauged. The roll 54 is provided with the ring ribs 114 and each rib 114 is provided with a plated surface 116, the plating being preferably with chromium. The threads have a broad base and a tapered outer part. The tip of the outer part is flattened as indicated at 117. Inasmuch as all of the rolls are alike, the description of one will suffice for the three.

Figure 4 shows the position of the two rolls 90 and 54 in contact with the screw 94. In this view it will be noted that the thread 114 of the roll 54 is a little higher than the rib 114 of the roll 90. This is caused by the difference in thickness of the spacers 64a and 64, and is made necessary because of the change in the helix angle of the thread on the screw 94.

In Figures 8 and 9 there is illustrated a modified form of roll 54' and there is illustrated the manner in which these rolls may be used to check on screw threaded elements 94a and 94b which may be the same or a different pitch diameter but have a different number of threads or a different pitch. The ribs 114 on the rolls 54' are so spaced that both screws 94a and 94b may be measured with the same setting although they have a different number of threads for the reason that the spacing of the ribs 114 of the rolls allows them to fit between the threads of the elements 94a and 94b because the threads of the two are a convenient and suitable multiple of each other. For instance, if screw 94a has a pitch of 16 while the pitch of screw 94b is 32, either screws of a 16 or 32 pitch may be measured from the same setting. Similarly, screws having a 20 and 28 pitch may be measured by the same setting, but which will necessitate different rolls than were used for the 16 or 32 pitch.

Where it is desired to measure screws having a different pitch diameter, the distance spacer 81 must be changed to give a spacing in accordance with the pitch diameter of the screw. A setting master or spacer 81 is required for each pitch diameter.

I claim:

1. In a screw thread gauging device, a base, a plurality of circumferentially ribbed gauging rolls mounted on the base, a slide mounted on the base, means constantly urging the slide toward the rolls, means to limit the sliding movement of the slide toward the rolls, a second slide mounted in the first slide, a circumferentially ribbed gauging roll mounted on said second slide and adapted to cooperate with the plurality of rolls on the base to determine the pitch of the threads, means constantly urging said second slide toward the stationary rolls, an indicating gauge mounted on the first slide and operable by the second slide, and manual means to withdraw the first slide from the stationary rolls to enable the insertion of a screw.

2. In a screw thread gauging device, a base, a plurality of rotatable circumferentially ribbed gauging rolls mounted in a stationary position on the base, a slide mounted in a slideway on the base, said slide reciprocable to and from the rolls, removable and replaceable means to limit the movement of the slide toward the rolls, a second slide mounted in the first slide, a rotatable circumferentially ribbed gauging roll mounted in a fixed position on the second slide, the adjacent ribs of each roll being in different parallel planes to determine the pitch of the thread of a screw, manual means to reciprocate the first mentioned slide, an indicating gauge mounted in a stationary position on the first-mentioned slide, said gauge operable by the second mentioned slide.

3. In a screw thread gauging device, a base, a plurality of rotatable circumferentially ribbed gauging rolls mounted on spaced parallel axes in a stationary position on the base, each roll being mounted on a different axis, a slide, a third rotatable circumferentially ribbed gauging roll mounted in a stationary position on the slide and adapted to cooperate with the other rolls to gauge the thread of the screw, means to limit the sliding movement of the slide toward the plurality of rolls, an indicating gauge mounted in a fixed position on and adapted to be operated with the slide, and means manually to operate the slide to separate the third roll from the plurality of rolls to enable the insertion of a screw between the rolls.

4. In a screw thread gauging device, a base, an end piece secured to the base, two rotatable circumferentially ribbed gauging rolls mounted in fixed positions on the end piece, a slide mounted on the base for movement to and from the end piece, means secured to the end piece to limit the movement of the slide toward the rolls, a second slide mounted in the first slide, a circumferentially ribbed gauging roll rotatably mounted in a fixed position on the second slide, said slide roll cooperable with the two end-piece rolls to determine the pitch of the thread of a screw, manual means to reciprocate the slides, an indicating gauge mounted on and operated with the second slide, said indicating gauge giving a direct reading of the amount of deviation of a screw to be gauged from a standard thread.

5. In a screw thread gauging device, a base, an end piece secured to the base, two rotatable circumferentially ribbed gauging rolls mounted in fixed positions on the end piece, a slide mounted on the base for movement to and from the end piece, means constantly urging said slide toward the rolls, means secured to the end piece to limit the movement of the slide toward the rolls, a second slide mounted in the first slide, means constantly urging the second slide toward the rolls, a circumferentially ribbed gauging roll rotatably mounted in a fixed position on the second slide, said slide roll cooperable with the two end-piece rolls to determine the pitch of the thread of a screw, manual means to reciprocate the slides, an indicating gauge mounted on and operated with the second slide, said indicating gauge giving a direct reading of the amount of deviation of a screw from a standard thread.

6. In a screw thread gauging device, a base, an end piece secured to the base, two rotatable circumferentially ribbed gauging rolls mounted in fixed positions on the end piece, a slide mounted on the base for movement to and from the end piece, removable and reciprocable means secured to the end piece to limit the movement of the slide toward the rolls, a second slide mounted in the first slide, a circumferentially ribbed gauging roll rotatably mounted in a fixed position on the second slide, said slide roll cooperable with the two end-piece rolls to determine the pitch of the thread of a screw, manual means to reciprocate the slides, an indicating gauge mounted on and operated with the second slide, said indicating gauge giving a direct reading of the amount of deviation of a screw from a standard thread.

7. In a screw thread gauging device, a base, two stationary rotatable circumferentially ribbed gauging rolls mounted on spaced parallel axes at one end of the base, a slide mounted on the base, means to reciprocate the slide to and from the rolls, a third roll movably mounted on the slide and adapted to cooperate with the two stationary rolls, said third roll being mounted on an axis parallel with the axis of the other two rolls, means to limit the movement of the slide toward the two stationary rolls, an indicating gauge rigidly mounted on the slide, the operation of said indicating gauge depending upon the movement of the moving roll, said gauge giving the direct reading of the accuracy of the screw thread.

8. In a screw thread gauging device, a base, two stationary rotatable circumferentially ribbed gauging rolls mounted on spaced axes at one end of the base, a slide mounted on the base, means to reciprocate the slide to and from the rolls, a third roll movably mounted on the slide and adapted to cooperate with the two stationary rolls, means to enable a relative movement between the slide and the third roll, means to limit the movement of the slide toward the two stationary rolls, an indicating gauge rigidly mounted on the slide, the operation of said indicating gauge depending upon the movement of the moving roll relative to the slide, said gauge giving the direct reading of the accuracy of the screw thread.

9. In a screw thread gauging device, a base, two stationary rotatable circumferentially ribbed gauging rolls mounted at one end of the base, a slide mounted on the base for reciprocation to and from the rolls, means to limit the movement of the slide toward the rolls, a second slide mounted for reciprocable movement on the first slide, a third circumferentially ribbed gauging roll mounted in the second slide, an indicating gauge adjustably mounted in the first slide and operated by the second slide, said gauge giving a direct reading of the accuracy of the screw thread.

10. In a screw thread gauging device, a base, two stationary rotatable circumferentially ribbed gauging rolls mounted at one end of the base, a slide mounted on the base for reciprocation to and from the rolls, means constantly urging said slide toward the rolls, means to limit the movement of the slide toward the rolls, a second slide mounted for reciprocable movement on the first slide, means constantly urging said second slide toward the rolls, a third circumferentially ribbed gauging roll mounted in the second slide, an indicating gauge adjustably mounted in the first slide and operated by the second slide, said gauge giving a direct reading of the accuracy of the screw thread.

11. In a screw thread gauging device, a base, two gauging rolls rotatably and removably mounted in stationary positions on the base, a third rotatable gauging roll, a plurality of movable means to mount the third roll on the base for movement to and from the stationary rolls, a plurality of circumferential ribs on each roll, means on the base and engageable with the mounting means for the third roll to limit the movement of the mounting means and third roll, said means limiting the movement in accordance with the size of the screw to be gauged, the three rolls adapted to receive a screw therebetween to determine the pitch thereof, and an indicating gauge mounted in a stationary position on one of said movable means, said plurality of means being relatively movable and said indicating gauge being operated by the movement of the third roll.

CARL HECKER.